United States Patent [19]
Jones et al.

[11] 3,904,741
[45] Sept. 9, 1975

[54] ALCOHOL SOLUBLE BASIC ALUMINUM CHLORIDES AND METHOD OF MAKING SAME

[75] Inventors: John L. Jones, North Plainfield; Andrew M. Rubino, New Providence, both of N.J.

[73] Assignee: Armour Pharmaceutical Company, Chicago, Ill.

[22] Filed: Oct. 26, 1970

[21] Appl. No.: 84,093

[52] U.S. Cl. .................................. 423/462; 424/68
[51] Int. Cl. .............................................. C01f 7/00
[58] Field of Search ................ 23/92; 423/462, 495; 424/47, 68

[56] References Cited
UNITED STATES PATENTS

| | | | |
|---|---|---|---|
| 2,196,016 | 4/1940 | Huehn et al. | 23/92 |
| 3,472,928 | 10/1969 | Virzi | 424/47 |
| 3,523,153 | 8/1970 | Holbert et al. | 23/92 X |
| 3,638,327 | 2/1972 | Levy et al. | 34/5 |

FOREIGN PATENTS OR APPLICATIONS

| | | | |
|---|---|---|---|
| 489,769 | 8/1938 | United Kingdom | 23/92 |
| 1,102,713 | 3/1961 | Germany | 23/92 |

OTHER PUBLICATIONS

The Merck Index, Merck & Co., Rahway, N.J., 8th Ed. 1968, pp. 44 & 45.
Govett, "American Perfumer and Essential Oil Review," April, 1947, pp. 365–368.

Primary Examiner—Earl C. Thomas
Attorney, Agent, or Firm—Seidel, Gonda & Goldhammer

[57] ABSTRACT

Basic aluminum chloride solids having a high degree of solubility in anhydrous alcohol and having particular utility as astringents in antiperspirants may be made by carefully controlling the molar ratio of aluminum to chloride and the amount of free and coordinated water present in the solid. A preferred method of making the solid comprises heating an aqueous solution of basic aluminum chloride having an Al/Cl ratio of about 1.9 under reflux conditions for about 2 to 4 hours and spray drying the solution to a friable solid having 18 to 20 weight percent of calculated free and coordinated water.

14 Claims, 1 Drawing Figure

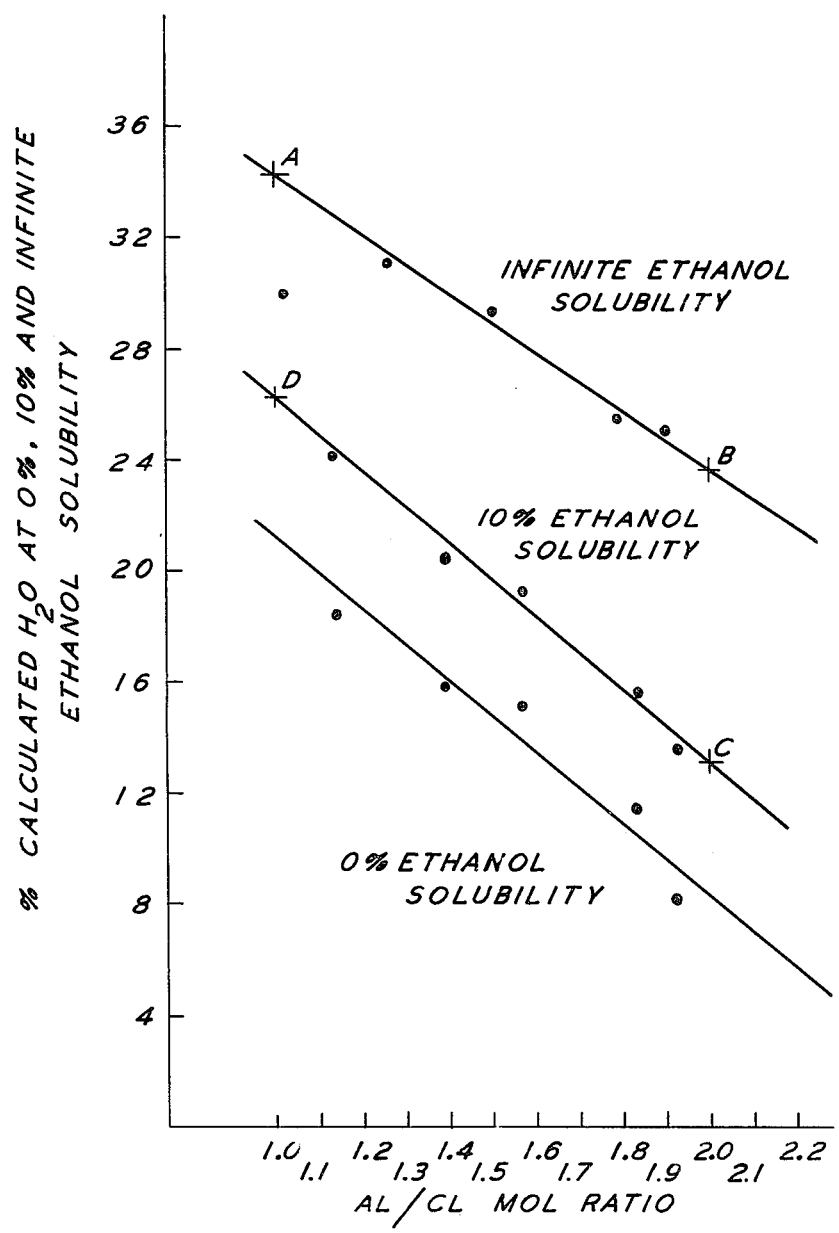

ALCOHOL SOLUBLE BASIC ALUMINUM CHLORIDES AND METHOD OF MAKING SAME

DISCLOSURE

The present invention relates to alcohol soluble basic aluminum chlorides and a method of making such products. More particularly, the invention relates to a method of making two-thirds to five-sixths basic aluminum chloride solids having a high degree of solubility in alcohol, and to products made by said method.

Aluminum compounds have been long known in the art to be useful as astringents in antiperspirant compositions and other cosmetic products. However, one of the major obstacles to the effective use of aluminum compounds in the so-called "aerosol" or "spray" antiperspirants has been the limited solubility of the aluminum compound in organic solvents such as ethyl alcohol. It is desirable that an antiperspirant composition have a relatively high content of alcohols and/or glycols to decrease drying time and to reduce powdering, as compared with purely water-based compositions. The use of a solvent such as alcohol also permits the addition to antiperspirant compositions of other materials, such as the halogenated hydrocarbon propellants, which are normally incompatible with or insoluble in water. Moreover, a relatively high degree of solubility in alcohol is required since it is generally accepted that a minimum concentration of from 10 to 20 percent of active ingredient is necessary to produce an effective antiperspirant solution.

One of the best commercially available antiperspirants, namely, aluminum chlorohydroxide (sold under the trademark "CHLORHYDROL"), has suffered from the disadvantage of insolubility in non-aqueous media, such as 95 percent alcohol, 100 percent propylene glycol, and 100 percent glycerine, and requires the addition of water or other water-containing solvents to obtain a soluble state. This addition of water is deleterious for several reasons. First of all, as already pointed out, drying time is adversely affected since water is less volatile than alcohol. This may result in a sticky feeling antiperspirant. Secondly, other constituents of the antiperspirant composition may be incompatible with water. Thirdly, water is extremely corrosive to the metal valves and containers used in the common aerosol dispensers. This corrosion results in undesirable contamination of the product.

Recent attempts to overcome these disadvantages have taken the form of reacting organic hydroxylic compounds with basic aluminum salt to form alcohol soluble aluminum compounds and complexes. See, for example, U.S. Pat. No. 3,359,169 for "Aluminum Compounds," issued to Joseph N. Slater, and U.S. Pat. No. 3,420,932 for "Methods of Making Alcohol Soluble Complexes of Aluminum and Preparations Employing the Complexes," issued to the present applicants and assigned to the same assignee as the present invention. While these efforts may be successful in overcoming the disadvantages of the prior art, it would still be more desirable if the already tested "Chlorhydrol" could be satisfactorily changed to meet aerosol demands without the addition of a new chemical component.

Accordingly, it is an object of the present invention to provide a basic aluminum chloride having a high degree of solubility in alcohols and other organic solvents.

It is a further object of the present invention to provide an alcohol soluble basic aluminum chloride containing a minimum amount of free and coordinated water.

It is another object of the present invention to provide an alcohol soluble basic aluminum chloride solid which is useful to form an effective liquid antiperspirant composition.

Still another object of the present invention is to provide a method of modifying a commercially available aluminum chlorohydroxide without the addition of a new chemical component in order to eliminate the requirement of adding water or watercontaining solvents to obtain a soluble state.

Still further objects will appear hereinafter.

It has been found that the above and other objects may be attained by maintaining the amount of free and coordinated water present in the basic aluminum chloride within a narrow range which lies between the point where the compound is just a friable solid and the point where the compound becomes substantially alcohol insoluble.

It has also been found that a basic aluminum chloride compound having a water content within this narrow range may be produced by a method comprising the steps of heating an aqueous solution of the basic aluminum chloride under reflux conditions for a predetermined time and carefully drying the solution to a solid under predetermined conditions.

For the purpose of illustrating the invention, there is shown in the drawing an idealized representation of a narrow range of water contents contemplated by the present invention; it being understood, however, that this invention is not intended to be limited by the precise data and ranges shown.

The drawing is a graph showing the interrelationship of the aluminum to chloride mol ratio, the precent calculated water, and the ethanol solubility of basic aluminum chlorides of the present invention, as dervied from the data of examples I to XX discussed hereinafter.

As used in the present invention, the term "basic aluminum chloride" refers to compounds having the general formula:

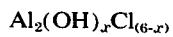

$$Al_2(OH)_xCl_{(6-x)}$$

wherein: $0<x<6$ and need not be an integer. Basic aluminum chlorides probably contain varying quantities of basic units such as $Al_2(OH)_2Cl_4$, $Al_2(OH)_4Cl_2$ and $Al_2(OH)_5Cl$; but because of the infinite number of combinations with $Al_2Cl_6$ up to precipitation of $Al_2(OH)_6$, $x$ in the above formula could vary in infinitely small values between the limits of 0 to 6.

It should be understood that the above formula is greatly simplified and is intended to include basic aluminum chlorides containing coordinated or bound molecules of water as well as basic aluminum chloride polymers, complexes and mixtures of the above.

Particularly suitable for the purposes of the present invention are basic aluminum chlorides having a basicity in the range of about two-thirds to five-sixths; that is, compounds of the above general formula having a predominance of units of $Al_2(OH)_4Cl_2$ and/or $Al_2(OH)_5Cl$, such that the aluminum to chlorine mol ratio ranges from about 1.0 to 2.0. It is doubtful that products below two-thirds basic would ever be useful in antiperspirants without the incorporation of buffers or other additives having similar effects.

For many years, it has been known that highly concentrated (i.e., 50–60 percent) aqueous solutions of the basic aluminum chlorides are completely miscible with cosmetic grade alcohols. However, the dried solids were reported to be virtually insoluble. This was probably due to the desire to remove most of what appeared to be free water rather than chance a slighly moist, sticky solid.

Fundamental studies have now shown that the solubility characteristics of basic aluminum chlorides are a function of the quantity of coordinated water retained in the structure. Furthermore it has been found that the quantity of water, which is sufficient to cause a phase change from water soluble only to methanol soluble or ethanol soluble, is a matter of only several percent based on the weight of the dried solids. It has also been found that the absolute quantity of water needed for alcohol solubility of the solid is a function of the mol ratio of aluminum to chloride (hereinafter referred to as the Al/Cl ratio).

Further studies have shown that the water content range for basic aluminum chlorides between where solidification occurs and alcohol solubility disappears is relatively narrow; that is, on the order of less than 10 percent based on the weight of the solid. A precise range cannot be readily defined, since such a range is dependent upon the Al/Cl ratio. Furthermore, it has been found that the solubility range may be substantialy affected by the method of drying (e.g. spray, air, vacuum or freeze) an aqueous solution of the basic aluminum chloride to form a solid and by any pretreatment administered to the aqueous solution before drying (e.g. refluxing, additives, raw materials or method of manufacture).

Therefore, in view of this critically small range of water content in basic aluminum chloride solids having good alcohol solubility, it has been found necessary to optimize the pretreatment in order to expand the range and then to use extraordinary precautions to dry the product to the desired range. Accordingly, it has now been determined that decreasing the Al/Cl ratio of the basic aluminum chloride, refluxing the aqueous solution of the compound, and spray drying the solution all tend to improve the alcohol solubility of the resulting solid, if the appropriate range of water content is maintained. It should also be noted that these factors also tend to improve the fluorocarbon compatibility of the solid. This feature is important due to the common use of halogenated hydrocarbons as propellants in aerosol dispensers.

In optimizing the pretreatment steps for producing alcohol soluble products, it was found that the method of preparing an aqueous solution of the basic aluminum chlorides does not substantially affect the solubility of the final product. Hence, an aqueous solution of basic aluminum chloride may be made directly (e.g., by the conventional reaction of aluminum metal with $AlCl_3$ or HCl in water solution) to the desired range of Al/Cl ratio or by adding aluminum chloride ($AlCl_3$) to a commercially available solution of aluminum chlorohydroxide (which may have an Al/Cl ratio as high as 2.0 or higher) to adjust the Al/Cl ratio to the desired range. From the standpoint of production convenience it is preferable to start with an aqueous solution of 50 percent aluminum chlorohydroxide, which may be obtained from the Reheis Chemical Company, a division of Armour Pharmaceutical Company, under the trademark "Chlorhydrol." This solution may then be adjusted to the desired Al/Cl ratio by the addition of an appropriate amount of 32° Baume aluminum chloride.

After adjusting the Al/Cl ratio, of the solution, the solution should be refluxed. The refluxing may be carried out in conventional equipment and the reflux temperature may vary from very low values up to the boiling point of the liquid. However, from the standpoint of time and convenience it is desirable to maintain a reflux temperature at or near the boiling point of the solution; that is, in the range of about 100° to 105°C. Using a reflux temperature in the latter range, the solution should be refluxed for a minimum of about 1 hour, and preferably between about 2 and 4 hours. Refluxing beyond about 4 hours seems to have no beneficial effect and may in some cases be detrimental.

The amount of refluxing which is actually necessary seems to be somewhat dependent upon the Al/Cl ratio of the solution. Hence, where the Al/Cl ratio is close to 2.0, refluxing for about four hours is preferable, whereas at low Al/Cl ratios approaching about 1.0, little or no refluxing is absolutely necessary to improve the solubility of the final product. While applicants do not wish to be limited by any particular theory of chemical structure, it is believed that the refluxing promotes a shift in the species of basic aluminum chloride molecules from predominantly polymeric to predominantly monomeric. It is also believed that as the Al/Cl ratio of the basic aluminum chloride is decreased from 2.0 or above to about 1.0 the species of molecules also shift from predominantly polymeric to predominantly monomeric. Hence, this phenomenon would explain the greater need for refluxing at Al/Cl ratios close to 2.0 and the lesser need for refluxing at ratios close to 1.0.

Having determined the optimum pretreatment conditions for forming an alcohol soluble basic aluminum chloride solid, a number of tests were run to determine more exact ranges of acceptable water content of an alcohol soluble solid as a function of the Al/Cl ratio of the solid. These tests are described in Examples I to XX, below, and the results are set forth in Tables I and II and illustrated on the graph in the accompanying drawing.

EXAMPLES I TO V

Five aqueous solutions of basic aluminum chloride were prepared from 50 percent (solids) aluminum chlorohydroxide (regular production grade "Chlorhydrol") by adjusting the Chlorhydrol to the desired Al/Cl ratio with the addition of 32° Baume aluminum chloride. The five Al/Cl ratios selected between 1.0 and 2.0 are shown in Table I. These five solutions were then refluxed for 4 hours each at about 100°C. Solid products were prepared from the above solutions by air drying the solutions under ambient conditions until the samples were just taken to solidification. In the case of Example V it was necessary to use a vacuum oven to reach solidification. All five solids were then assayed for aluminum and chloride content by accepted analytical procedures. The water content of each solid was then determined both by a standard Karl Fischer titration and by calculation based on the assay values of aluminum and chloride.* Solubility tests were then performed on each of the five solids by mixing 20 grams of the pulverized solid with 30 grams of ethanol (SDA-40). The resulting slurries were allowed to shake on a Burrell shaker for three days, and where solubility was appreciable, additional quantities of solids were added and allowed to equilibrate. The solutions were then allowed to settle, decanted, and centrifuged to clarity, after which weighed aliquots of the clear solution were allowed to evaporate under ambient conditions until free of solvent. The pertinent data and results of these examples are set forth in Table I, below.

*The theoretical amouont of free and co-ordinated water is calculated by solving the following equation for mols [OH]:

$$\text{mols [OH]} + \text{mols [Cl]} = 3 \, [\text{mols Al}]$$

and then subtracting the weight percents of OH, Cl and Al from 100 percent.

EXAMPLES VI TO XX

Fifteen basic aluminum chloride solutions were prepared and adjusted to various Al/Cl ratios in the same manner as described in Examples I–V. After refluxing each of the solutions for 4 hours at about 100°C., the solutions were vacuum dried at from ambient temperatures to 60°C., depending on the desired degree of moisture content. In each example the solution was dried beyond the point of just solidification, and the degree of drying was varied in an attempt to obtain a wide spread of data points. The solids were then assayed for aluminum and chloride, and the theoretical water content of each solid was calculated as in Examples I–V above. Since most of the samples were too insoluble in methanol, no assays for water by Karl Fischer titration were made. Solubility tests were then performed on each of the fifteen samples in the same manner as described in Examples I–V above. The pertinent data and results of these examples are set forth in Table II below.

Solubility," which is defined as the solubility of a basic aluminum chloride product which has been dried to a point where it first becomes a friable solid; or in other words, the maximum solubility of a friable basic aluminum chloride solid. It should be noted that the data point for Example V is probably unrealistic, since as already noted it was necessary to use vacuum oven drying, and overdrying may have resulted.

Next, the values of percent solubility in ethanol given in Table II were plotted against the calculated water content values also given in Table II for Examples VI–XX. The resulting lines on the latter graph (not shown) drawn through each set of three data points from the examples as grouped in Table II were extrapolated to zero percent ethanol solubility. The interpolated and extrapolated values where these lines crossed zero percent solubility and ten percent solubility were then plotted on the graph in the accompanying drawing against the average Al/Cl ratio for each set of three examples as grouped in Table II. The figure of ten percent ethanol solubility was selected since this is generally considered to be the minimum acceptable solubility for forming antiperspirant solutions.

Hence, the range encompassed between the lines for 10 percent ethanol solubility and "Infinite Ethanol Solubility" on the accompanying graph gives an approximation of the acceptable water content of basic aluminum chloride solids having an Al/Cl ratio between 1.0 and 2.0. It should be emphasized, however, that the ranges shown are somewhat idealized, since drying was carried out very slowly and carefully to avoid overdry-

TABLE I

| Ex. | %Al | %Cl | Al/Cl Ratio | Water Content at the Solidification Boundary for Various Al/Cl Ratios % Solubility in Anhydrous Ethanol | Karl Fischer %H$_2$O | Calculated %H$_2$O |
| --- | --- | --- | --- | --- | --- | --- |
| I | 23.1 | 15.9 | 1.910 | In all 5 examples solubility was greater than 40%; the maximum solubility being limited only by the viscosity of the resulting solution. | 29.2 | 25.1 |
| II | 22.9 | 16.5 | 1.821 | | 29.7 | 25.4 |
| III | 21.1 | 18.5 | 1.490 | | 34.3 | 29.5 |
| IV | 20.1 | 20.7 | 1.270 | | 35.9 | 31.2 |
| V | 19.8 | 25.2 | 1.03 | | 35.5 | 29.7 |

TABLE II

| | The Effect of Al/Cl Ratio and Calculated Water Content on Alcohol Solubility | | | | |
| --- | --- | --- | --- | --- | --- |
| Ex. | %Al | %Cl | Al/Cl Ratio | % Solubility in Anhydrous Ethanol | % Calculated H$_2$O Content |
| VI | 28.1 | 19.0 | 1.949 | 0.3 | 9.0 |
| VII | 26.9 | 18.3 | 1.930 | 6.0 | 12.7 |
| VIII | 26.4 | 18.0 | 1.927 | 39.5 | 14.3 |
| IX | 27.2 | 19.1 | 1.870 | 0.17 | 11.7 |
| X | 26.48 | 18.73 | 1.855 | 4.0 | 13.9 |
| XI | 25.6 | 18.5 | 1.819 | 38.0 | 16.5 |
| XII | 25.6 | 20.6 | 1.631 | 0.450 | 15.4 |
| XIII | 24.9 | 20.8 | 1.570 | 3.79 | 17.0 |
| XIV | 23.6 | 20.4 | 1.521 | 40.5 | 21.2 |
| XV | 24.9 | 23.0 | 1.422 | 0.444 | 16.2 |
| XVI | 24.6 | 21.8 | 1.481 | 3.12 | 17.6 |
| XVII | 23.5 | 23.4 | 1.320 | 8.8 | 20.0 |
| XVIII | 23.7 | 25.2 | 1.238 | 0.199 | 18.45 |
| XIX | 22.8 | 26.2 | 1.142 | 4.45 | 20.5 |
| XX | 20.93 | 26.03 | 1.058 | 12.0 | 25.94 |

The values of calculated water content given in Table I were then plotted on the graph in the accompanying drawing against the Al/Cl ratio values given for Examples I–V in Table I. The line which is drawn through these points on the graph is labeled "Infinite Ethanol ing, and such slow and careful drying would not necessarily be practical for commercial application. For example, if the solutions in the above examples had been spray dried (which as discussed more fully below is an optimum production condition) to similar low contents of calculated water, a large portion of each of the products would have been overdried, and therefore largely alcohol insoluble. This tendency toward overdrying increases with the Al/Cl ratio, and in fact, products having Al/Cl ratios above about 2.0 are much less commercially desirable due to difficulty of drying, lower solubility in alcohol, cloudy alcohol solutions, and a tendency of the alcohol solutions to form a solid gel in a short period of time. Finally, due to the difficulty of using Karl Fischer titrations for determining the water content in many of the examples and the large discrepancy in the values obtained where Karl Fischer titrations were used, it was necessary to plot the calculated theoretical water contents.

In any event, the plotted lines in the accompanying drawing obviously point out the direct relationship between water content and alcohol solubility of basicities varying from about two-thirds to five-sixths (i.e., Al/Cl ratios from about 1.0 to 2.0). The zero percent solubility line indicates the absolute minimum calculated water content which is the boundary line between water solubility only and a start of alcohol solubility, whereas the maximum water content that can be tolerated to produce a friable solid is indicated by the line of "Infinite Ethanol Solubility." It is interesting to note that, although there is a significant increase in the absolute water content (with respect to solubility) as the Al/Cl ratio decreases, there is very little difference in the size of the range between minimum and maximum water contents at corresponding ratios. That is, the range between minimum and maximum at any ratio from about 1.0 to 2.0 is about thirteen to sixteen percent calculated water, and the range between water content at 10% solubility and maximum water content is about 8–10 percent calculated water.

The precise nature of the chemical structure which causes alcohol solubility of the basic aluminum chlorides lying within the ranges shown on the accompanying graph is not known, and applicants do not wish their invention to be limited by any particular theory. However, it can be speculated that a specific ratio of $H_2O$ units to $Al_2$ units is critical for each molecular species that exists in nearly all products. Furthermore, each product is believed to be a mixture of a number of polymeric species. An examination of various possible structural forms of basic aluminum compounds shows that, as the polymer size increases, the quantity of water needed to satisfy the coordination spheres of aluminum decreases. The large size of the polymer could decrease solubility and also permit less water to be removed before detrimental decomposition (without further polymerization) occurs. This would explain the increased tendency toward overdrying at high Al/Cl ratios, since water could conceivably be lost at some point along the polymer chain and cause partial conversion of the molecule to the oxide. However, as the basicity of the product is decreased (i.e., as the Al/Cl ratio is decreased), predominantly monomolecular species would be approached, and since the chain length would thus tend to become shorter, the molecules of water would tend to be distributed more uniformly along the polymer chain. Therefore, upon removal of water, there would be less tendency toward overdrying and less tendency for conversion of molecules to the oxides. This effect is similar to that discussed above in connection with refluxing.

On the basis of the above discussion and the relationship shown in the accompanying graph, it would appear that the most preferable basic aluminum chloride solids would be those having Al/Cl ratios approaching 1.0. However, there are a number of other important factors which must be considered if the solids are to be used in the preparation of a safe and effective antiperspirant composition. First of all, as mentioned earlier it is desirable to have as low a water content as possible, and it is evident from the graph that products having low Al/Cl ratios have higher water contents. Secondly, products having low Al/Cl ratios produce alcoholic solutions which are quite acidic, and this is undesirable in a commercial product due to the possibility of skin irritation. Furthermore, as pointd out earlier, it would be most desirable to produce a satisfactory product which needs only slight change from the currently commercialized "Chlorhydrol," which has an Al/Cl ratio on the order of about 2.0 or above.

Although the optimum basic aluminum chloride solid from the standpoint of alcohol solubility and halohydrocarbon compatibility would be one in which the Al/Cl ratio is about 1.65 to 1.70, it appears on the basis of the above factors, that the most commercially desirable products would have an Al/Cl ratio between about 1.85 and 1.95, with a preferred range of about 1.90 to 1.92. Such a product would still have a maximum solubility in ethanol of about 40% without danger of gelation or solidification of the alcohol solution.

A final factor which must be considered in obtaining an optimum basic aluminum chloride solid is the method of drying. At least five different drying processes have been tried, including: spray drying, drying under atmospheric temperature and pressure, rapid vacuum drying under atmospheric conditions, freeze drying and azeotropic distillation in alcoholic solution. From the standpoint of producing a clear alcoholic solution with maximum halohydrocarbon compatibility, azeotropic distillation was superior to other methods tried. However, this process may be commercially less desirable since it would involve greater costs in alcohol recovery and would only produce an alcoholic solution, whereas a dried solid may be considered more desirable. Of the other processes tried, spray drying proved to be far superior, both from the standpoint of economic cost and quality of the final product.

While the particular conditions for spray drying will vary according to the particular spray drying apparatus employed, the following conditions have been found to be exemplary: using a Bowen, 3 foot, flat bottom, pilot plant spray dryer, spray drying outlet temperatures between about 150° and 170°F. at feed rates of about 50 to 120 mls. per minute were the most ideal. Lower outlet temperatures and higher feed rates resulted in products with too high a moisture content, and higher outlet temperatures and/or lower feed rates resulted in products having decreased solubility and increased insolubles. Furthermore, the operation of a spray dryer is such that for a given inlet temperature, the outlet temperature is inversely related to the feed rate. For example, satisfactory samples were dried in a Bowen, 7 foot spray dryer at an outlet temperature of 170°–175°F. while the inlet temperature was varied from 325°–400°F and the feed rate was varied from about 7 to 11 lbs/min. Finally, it is desirable to cool the solution, preferably to about room temperature, between refluxing and spray drying.

In the final analysis, the critical factor which determines the degree of solubility in alcohols is the amount of free and coordinated water retained on the product.

For a product having an Al/Cl ratio in the preferred range of about 1.90 to 1.92, a calculated water content of about 16 to 20 percent, and preferably 18 to 20 percent, based on the total weight of the solids is desirable. Such a level of water content is sufficiently above the amount of water needed for 0 or 10 percent ethanol solubility so as to avoid a danger of a large amount of product being overdried in the spray dryer to the point of insolubility in alcohol. On the basis of the above criteria, suitable operating conditions for any specific spray dryer may be readily determined by one of ordinary skill in the art. Moreover, suitable water contents for products having other Al/Cl ratios between about 1.0 and 2.0 may be readily determined by reference to the accompanying graph and the above criteria.

As with all basic aluminum chloride products, drying temperatures and storage temperature conditions will directly affect the degree of decomposition of the product, the rate and degree of solubility of the product in alcohols, and the compatibility of the product with halo-hydrocarbons and other organic additives. Therefore, it is important that the product be cooled to ambient or below ambient temperatures as rapidly as possible after drying and then stored in a relatively cool environment. Furthermore, due to this heat sensitivity of the product, heat should not be applied in attempting to speed up the dissolution rate of the product in solvents.

The preferred embodiments of the present invention will be understood more clearly with reference to the following typical and specific examples:

EXAMPLE XXI

A typical product is prepared by adjusting the Al/Cl ratio of a 50 percent solution of Chlorhydrol to 1.90 to 1.92. The solution is then heated to about 100° to 105°C. and maintained under refluxing conditions for at least 2 and preferably 4 hours. The solution is then cooled and spray dried under conditions which are comparable to an outlet temperature of about 150° to 170°F. and a feed rate of 90cc per minute in a three foot diameter Bowen flatbottom dryer. The dried product is then chilled to ambient as rapidly as possible.

A typical product produced as in the above example would be soluble in anhydrous ethanol (SDA-40) to the extent of at least 30 percent by weight to give a hazy to slightly cloudy solution in from 2 to 6 hours. The insolubles will be less then 0.1 percent and can be filtered from the solution. The carbon tetrachloride compatibility (measured by titrating $CCl_4$ into 60 grams of a 30 percent SDA-40 solution until the first permanent haze is reached) will range from about 55 to 75cc. A typical analysis of the product is as follows:

| | |
|---|---|
| Aluminum | 25.0% |
| Chloride | 17.1% |
| Al/Cl | 1.92 |
| $H_2O$ (by Karl Fischer) | 22.8% |
| $H_2O$ (calculated) | 18.9% |
| Iron | 64 ppm |
| $SO_4$ | <0.01% |
| Lead | <5 ppm |
| Arsenic | <1.0 ppm |
| pH | 4.1 (30% in $H_2O$) |
| pH | 2.5 (30% in SDA-40). |

EXAMPLE XXII

A preparation was made by selecting a production batch of basic aluminum chloride (Chlorhydrol) assaying 12.2 percent aluminum and 8.38 percent chloride (Al/Cl ratio of 1.91). Exactly 8000 grams of this solution was subjected to heating at about 100°C. under reflux conditions for 4.0 hours. The cooled solution was then spray dried in a three foot Bowen flat-bottom laboratory dryer at an outlet temperature of 160°F. and a feed rate of 90cc per minute. The yield was 1,663 grams assaying 24.6 percent Al, 17.04 percent Cl, and 22.5 percent $H_2O$ by Karl Fischer (19.8 percent calculated). The resulting solid product was soluble in anhydrous ethanol (SDA-40) to the extent of 30 percent in less than 4 hours with agitation under ambient conditions.

Products of the present invention also show good solubility in solvents other than anhydrous ethanol. For example, a typical product similar to those in Examples XXI and XXII has shown a solubility of about 50 percent in anhydrous methanol and a solubility of about 26 percent in glycerol. Hence, products of this type could be of great value in aerosol or applicator type formulations, including antiperspirants, where a high alcohol content would be advantageous. There is also a potential use of the product as an intermediate in the preparation of aluminum complexes and derivatives where it is desirable to use a medium of relatively low water content.

Finally, the products of the present invention have several advantages over the previously made alcohol soluble aluminum complexes, while sacrificing only a little in alcohol solubility. First of all, since the glycol and other complexes of the basic aluminum halides generally have large molecules with a low aluminum concentration, the product cost for placing an equivalent amount of aluminum in the solution may be substantially reduced with the products of the present invention. Furthermore, the simplicity of the method of the present invention and the lack of additional components, will result in a substantial saving in processing costs.

In the interpretation of the foregoing specification and the following claims, it is to be understood that the term "calculated," when used to refer to the free and coordinated water present in the compound, means the theoretical amount of water as calculated by the method described in the footnote at page 8 of the specification. Also, it is to be understood that "friable state" refers to a solid state such that the compound is dry enough to be readily pulverized or powdered.

The present invention may be embodied in other specific forms without departing from the spirit or essential attributes thereof and, accordingly, reference should be made to the appended claims, rather than to the foregoing specification as indicating the scope of the invention.

We claim:

1. A method of preparing a two-thirds to five-sixths basic aluminum chloride solid having a high degree of solubility in alcohol comprising the steps of preparing an aqueous solution of two-thirds to five-sixths basic aluminum chloride, then heating the solution of basic aluminum chloride under reflux conditions, drying the refluxed solution to a solid having a calculated weight percent of free and coordinated water lying within the range encompassed by the quadrilateral defined by points A, B, C and D in the accompanying drawing, and cooling the solid to at least about ambient temperature to impede decreases in compatability of the solid.

2. A method according to claim 1 wherein the aqueous solution is heated at about 100°C. under reflux conditions for about 2 to 4 hours.

3. A method according to claim 1 wherein the solution is spray dried.

4. A method according to claim 1 wherein the solution is cooled after refluxing.

5. A method according to claim 1 wherein the basic aluminum chloride has an Al/Cl mol ratio of about 1.90 to 1.92 and the solution is dried to a solid having a calculated weight per cent of free and coordinated water of about 18 to about 20.

6. A method of preparing a two-thirds to five-sixths basic aluminum chloride solid having a high degree of solubility in alcohol comprising the steps of preparing an aqueous solution of two-thirds to five-sixths basic aluminum chloride, then heating the solution of basic aluminum chloride under reflux conditions, drying the refluxed solution to a solid having a calculated weight percent of free and coordinated water of not more than about 10 weight percent (based on the total weight of the solid) below the calculated weight percent of free and coordinated water present at the point at which the solution just becomes a friable solid, and cooling the solid to at least about ambient temperature to impede decreases in compatibility of the solid.

7. A method according to claim 6 wherein the aqueous solution is heated at about 100°C. under reflux conditions for about 2 to 4 hours.

8. A method according to claim 7 wherein the solution is spray dried.

9. A method according to claim 8 wherein the solution is cooled before drying.

10. A method according to claim 6 wherein the basic aluminum chloride has an Al/Cl mol ratio of about 1.90 to 1.92 and the solution is dried to a solid having a calculated weight percent of free and coordinated water of about 18 to about 20.

11. A 2/3 to 5/6 basic aluminum chloride solid made according to the method of claim 1 and having a high degree of solubility in anhydrous ethanol within 2 to 6 hours.

12. A basic aluminum chloride solid according to claim 11 having an Al/Cl mol ratio of about 1.85 to 1.95.

13. A 2/3 to 5/6 basic aluminum chloride solid made according to the method of claim 6 and having a high degree of solubility in anhydrous ethanol within 2 to 6 hours.

14. A basic aluminum chloride solid according to claim 13 having an Al/Cl mol ratio of about 1.85 to 1.95.

* * * * *